Patented Oct. 5, 1937

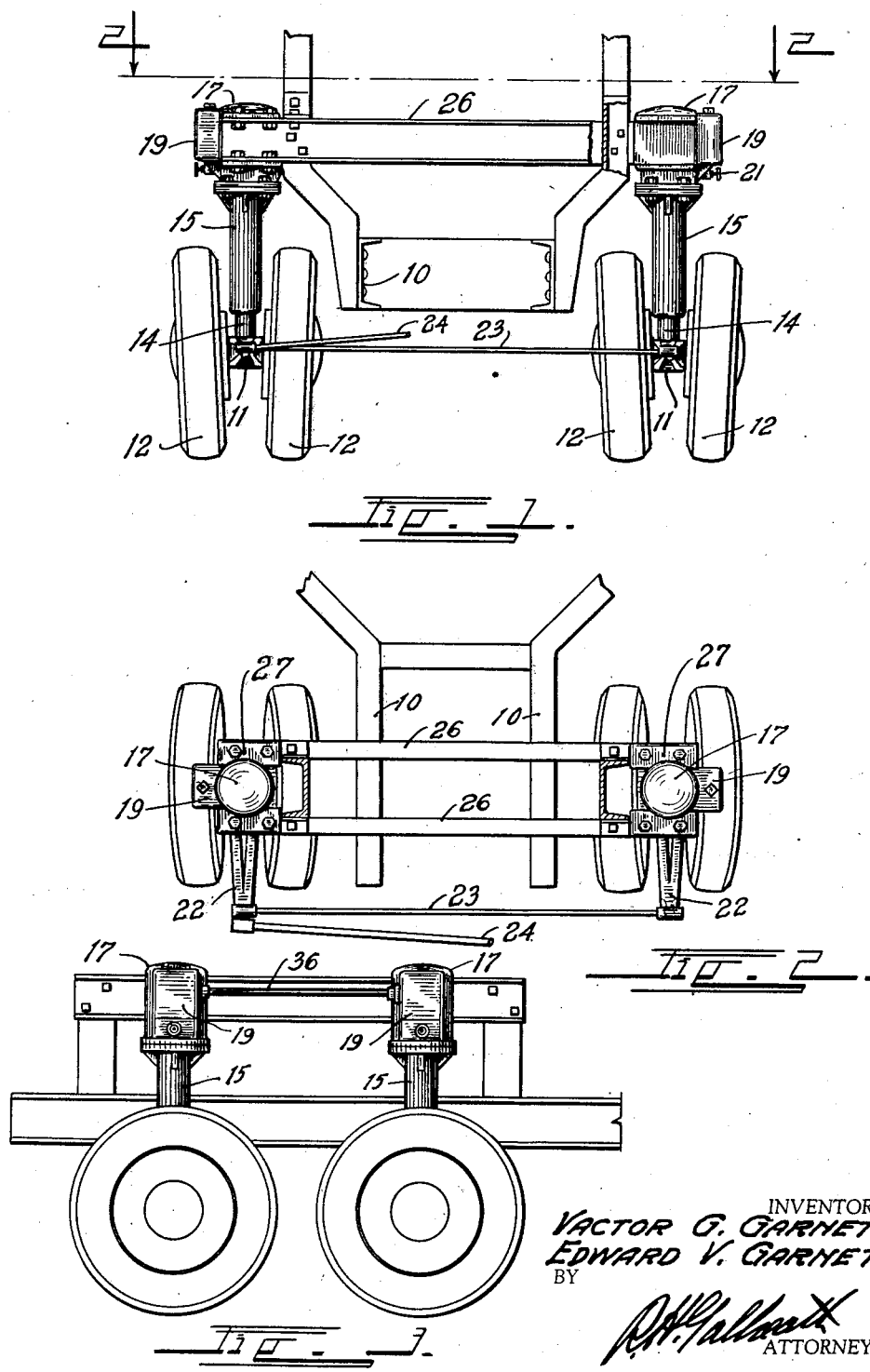

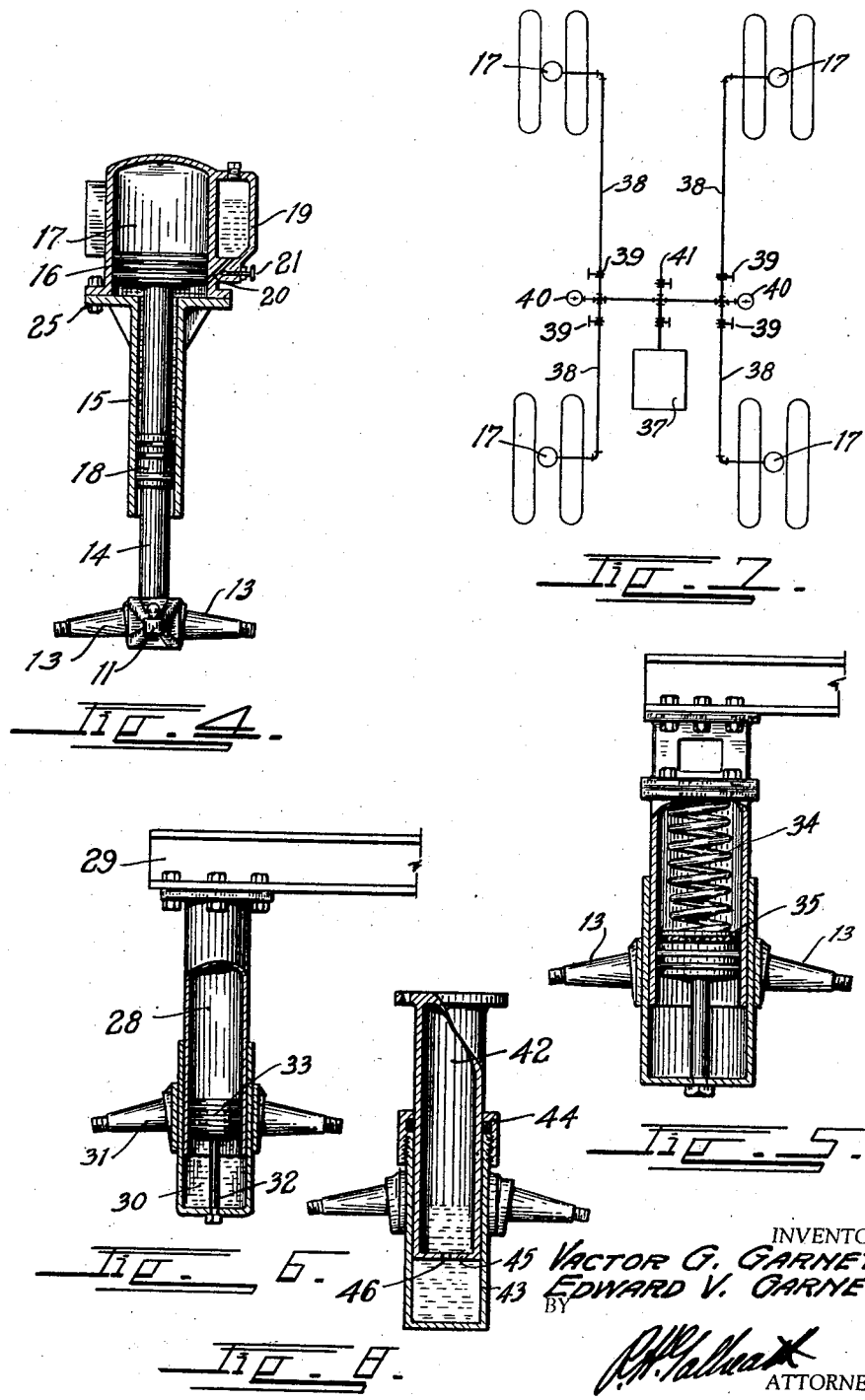

2,094,882

UNITED STATES PATENT OFFICE 2,094,882

WHEEL SUSPENSION FOR VEHICLES

Vactor G. Garnett and Edward V. Garnett, Denver, Colo.

Application August 10, 1935, Serial No. 35,582

4 Claims. (Cl. 280—124)

This invention relates to a wheel mounting construction for automotive vehicles, more particularly for use on heavy tonnage trucks and busses. The earlier trucks carried their entire pay load upon the rear wheels using the front for steering purposes only. With the necessity for still heavier loads the traffic type or "camel-back" type of truck has come into use with double or dual rear wheels and heavier forward construction in which one-third of the load was carried on the front wheels and two-thirds upon the rear wheels. Heavier loads could not be carried on the single front wheels and dual wheels were not practical for steering purposes.

The principal object of this invention is to provide a dual wheel mounting construction which will make the use of dual wheels practical for the front truck wheels so as to enable the load to be carried equally on both the front and rear wheels and to so mount the dual wheels that the load will be carried between the pairs of dual wheels so as to be evenly distributed thereon and so that for steering purposes, the pivot point will be positioned between the wheels so as to create a uniform castor effect to facilitate steering.

Other objects of the invention are: to provide a dual wheel mounting in which the dual wheels will be absolutely independent of each other so that either wheel can be removed without affecting the other wheel; to suspend the load between the wheels so as to reduce the axle extension distance and the bending strains therein; to provide a spring suspension which will serve also as a pivot for the steering device; to utilize the resiliency of air as the spring; and to obtain a greater turning radius for the front wheels.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a front view of the improved wheel suspension applied to a typical truck chassis.

Fig. 2 is a plan view thereof.

Fig. 3 is a detail side elevation of a "tandem" wheel mounting with the invention applied thereto.

Fig. 4 is a vertical detail section through the wheel mounting of Fig. 1.

Figs. 5 and 6 are vertical sections through mountings illustrating alternate forms of the invention.

Fig. 7 is a diagram illustrating how the pressure cylinders at the four corners of the chassis may be connected to a source of air supply.

Fig. 8 illustrates a third alternate form of the invention.

In the drawings a typical truck chassis is indicated at 10; supported upon pairs of associated wheels 12 known to the trade as dual wheels. The invention comprises a mounting block 11 positioned between the dual wheels 12 and provided with oppositely extending axle studs 13 for receiving the wheels 12. A post 14 extends upwardly from the mounting block 11, and is slidably supported in a guide sleeve 15. The upper extremity of the post 14 terminates in a piston 16 within a compression cylinder 17. The sleeve 15 and the cylinder 17 may, if desired, be formed as a single unit. As illustrated, they are formed as two separate units bolted together by means of suitable bolts 25. A sealing pad 18 is formed about the post 14 adjacent the lower extremity of the sleeve 15. The piston 16 and the pad 18 are provided with suitable sealing means such as sealing rings, cup washers, packing, etc. The top of the compression cylinder 17 is completely closed to form a compression chamber. An oil reservoir 19 is formed alongside the compression chamber and communicates with the lower portion thereof through a duct 20 controlled by a needle valve 21.

Steering brackets 22 are secured on each of the blocks 11 and connected together by means of a tie rod 23 across the chassis 10. A steering rod 24 connects one of the brackets with the steering mechanism of the vehicle. The brackets 22 may be extended either forwardly or rearwardly from the blocks 11. It has been found more satisfactory to extend them forwardly therefrom as it gives a trailing or castor effect to the wheels. The rods 23 and 24 are, of course, secured to the brackets 22 by means of suitable pivot connections such as the usual ball and socket joints.

It can be readily seen that the load upon the wheels is supported upon air in the compression cylinder 17 which acts as a resilient spring or cushion for the load and allows the dual wheels to be freely turned for steering purposes. The oil from the oil reservoir 19 constantly maintains a layer of oil over and about the piston 16 to prevent air from escaping through the bottom of the cylinder. The oil also fills the cylinder below the piston and the space between the post 14 and the sleeve 15. As the piston rebounds downwardly, it compresses the oil in the sleeve 15 and forces the excess back above the piston and also in to the reservoir 19 so that a positive air seal is maintained about the bottom of the cylinder and a shock absorbing effect is obtained from the oil. The piston 16 cuts off the duct 20 before the bottom of the cylinder 17 is reached so as to form a final oil cushion to prevent metal to metal contacts.

The sleeve 15 or the cylinder 17 may be secured to the chassis 10 in any desired manner. One method of securing is illustrated in Fig. 1 in which bracket plates 26 are formed on the cylinder 17. The plates 26 are bolted directly to horizontal members 26 of the chassis 10.

It is preferred to form the axle studs 13 with a downward camber so as to swing the bottoms of the wheels 12 inwardly toward each other. This serves a double purpose. It places the load more centrally over the wheels and lessens bending strains in the studs 13 and it also narrows the contact area of the wheels so as to facilitate steering.

The invention is adaptable to many different forms. Two alternate forms are shown in Figs. 5 and 6. In Fig. 6, an inner sleeve 28, closed at its top, is bolted directly to a chassis member 29. An outer sleeve 30, closed at its bottom, telescopes over the lower extremity of the inner sleeve 28. This outer sleeve 30 carries suitable axle studs 31 for receiving the dual wheels at opposite sides thereof. A piston rod 32 extends upwardly from the closed bottom of the outer sleeve 30 to a piston 33 acting within the inner sleeve 28. The action of this form is similar to the previous form. A load on the chassis compresses air within the sleeve 28 to form a resilient suspension for the chassis. The outer sleeve pivots freely about the inner sleeve for steering purposes. The bottom of the outer sleeve may be filled with oil to maintain the seal between the two sleeves.

The form shown in Fig. 5 is similar to the form of Fig. 6 except that a coiled compression spring 34 is employed for the cushion instead of air, and a thrust bearing 35 is positioned between the spring and the bottom of the outer sleeve.

The mounting has many advantages, it reduces weight in that the wheels are not carried on the extremity of a long heavy axle which is subject to bending strains. The load is centralized over a single pivot point that is supported uniformly from both sides so that steering is facilitated. The outer wheels can be removed directly without interference with the inner wheel, and by disconnecting the cross rod 23, the inner wheels can be swung around to the outside so that they may be quickly and easily changed without interference from the outer wheel.

The principle involved in this invention is the placing of the load centrally between the dual wheels instead of to one side of the dual wheels as is the present custom and, where it is desired to turn the wheels for steering purposes, using this centrally located load point for a steering pivot. Any desired type of spring or resilient suspension may be used provided, of course, that it is adaptable to the central pivot principle.

In cases of extremely heavy loads the dual wheels could be mounted in closely associated pairs or "tandems" at each side of the chassis as shown in Fig. 3, and the pressure cylinders of each pair connected by an equalizing pipe 36 at each side of the chassis. This automatically equalizes the load upon the two pairs of dual wheels at each side of the chassis for if the forward pair strikes an obstruction the air from its pressure cylinder will be forced back into the pressure cylinder of the second pair so as to place a portion of the load upon the latter pair. The air pressure thereby acts as an automatic equalizer similar to a hydraulic brake system.

In Fig. 7 a method of connecting the pressure cylinders at the various corners of the truck to a source of air supply. In this method a pressure reservoir 37 is mounted on the chassis and connected by conduits 38 with the various pressure cylinders. The conduits are controlled by suitable valves 39 so that compressed air from the reservoir can be admitted to any desired pressure cylinder. This enables the load to be trimmed or leveled, if unevenly loaded, by placing more air in the cylinders at one side than at the other. It also enables the spring action to be regulated to suit the weight of the load.

Another use for the air cylinder is in what is known as the "shuttle system" of trucking in which one chassis handles several bodies so that the bodies can be loaded and unloaded without taking the truck or chassis out of service. This is accomplished by placing the chassis beneath a body and admitting air to the cylinders so as to lift the chassis beneath the body and lift the latter from its supports. To deposit a body it is only necessary to admit air to the cylinders to lift the body then run it over the supports to deposit it by exhausting the air through an exhaust valve 41.

By placing pressure gauges 40 in the conduits, the weight carried can be determined by the air pressure indicated in the pressure cylinders.

In Fig. 8, still another method of making use of air as the spring is illustrated. In this form an outer cylinder 43 having a closed bottom carries the axle studs and slidably receives an inner cylinder 42. The inner cylinder is closed at its top and partially closed at its bottom by means of a bottom plate 45 having a port opening 46. A sealing gland ring 44 is threaded onto the upper extremity of the outer cylinder to seal it to the inner cylinder 42. In use the outer cylinder 43 is partially filled with oil, as illustrated, which rises through the port 46 when weight is applied to the inner cylinder and acts as a piston to compress the air therein, as in the previously described forms. On a rebound a partial vacuum will be formed in the outer cylinder which will draw oil back through the port 46 creating a shock absorbing effect. The effect or action of the air spring can be regulated by varying the size of the opening 46.

While a specific form of the improvement has been described and illustrated herein, it is desired to be understood that the same may be varied, within the scope of the appended claims, without departing from the spirit of their invention.

Having thus described the invention, what is claimed and desired secured by Letters Patent is:—

1. Means for mounting dual wheels on a chassis comprising: a first vertical cylinder having a closed bottom positioned between said wheels; axle studs extending oppositely outward from the wall of said first cylinder above the closed bottom thereof for carrying said dual wheels; a second vertical cylinder having a closed top telescoping into the open top of said first cylinder; fluid carried in said first cylinder; and means for sealing said first to said second cylinders so as to prevent escape of said fluid.

2. In a vehicle having a chassis, a cross member extending across said chassis; a closed topped, vertical cylinder extending downwardly from each extremity of said cross member; a second, closed bottomed cylinder fitted upwardly in telescopic relation over the lower extremity of each vertical cylinder; fluid in said second cylinders, said first vertical cylinders floating on said fluid; and means for securing a wheel at each side of each of said second cylinders above the closed bottoms thereof.

3. In a vehicle having a chassis, a cross member extending across said chassis; a closed topped, vertical cylinder extending downwardly from each extremity of said cross member; a second, closed bottomed cylinder fitted upwardly in telescopic relation over the lower extremity of each vertical cylinder; fluid in said second cylinders, said first vertical cylinders floating on said fluid; a pair of axle studs carried by, and extending oppositely outward from the sides of each of said second cylinders above the bottom thereof; and a wheel mounted on each of said axle studs, so that the weight of said chassis will be transmitted through said fluid to said wheels.

4. Means for mounting dual wheels on a vehicle chassis comprising: a first, vertically positioned cylinder having a closed bottom and an open top; an axle stud projecting outward from the opposite sides of said cylinder intermediate its extremities for receiving said dual wheels, said cylinder projecting below the axes of said wheels; a second cylinder having a closed top telescopically fitted into the open top of said first cylinder; and means for securing the upper extremity of said second cylinder to said chassis.

VACTOR G. GARNETT.
EDWARD V. GARNETT.